United States Patent [19]

Wipasuramonton

[11] Patent Number: 4,938,501
[45] Date of Patent: Jul. 3, 1990

[54] INFLATOR HOUSING STRUCTURE
[75] Inventor: Pongdet P. Wipasuramonton, Rochester, Mich.
[73] Assignee: TRW Vehicle Safety Systems Inc., Washington, Mich.
[21] Appl. No.: 322,079
[22] Filed: Mar. 10, 1989
[51] Int. Cl.⁵ .............................................. B60R 21/16
[52] U.S. Cl. ................................................... 280/743
[58] Field of Search ............... 280/736, 740, 728, 729, 280/743, 741, 742

[56] References Cited

U.S. PATENT DOCUMENTS

| | | | |
|---|---|---|---|
| 3,514,124 | 5/1970 | Richardson | 280/150 |
| 3,632,132 | 1/1972 | Richardson | 280/150 |
| 3,692,495 | 9/1972 | Schneiter et al. | 23/281 |
| 3,715,131 | 2/1973 | Hurley et al. | 280/743 |
| 4,153,273 | 5/1979 | Risko | 280/743 |
| 4,200,615 | 4/1980 | Hamilton et al. | 422/166 |
| 4,414,902 | 11/1983 | Strasser | 280/741 |
| 4,561,675 | 12/1985 | Adams et al. | 280/734 |
| 4,830,401 | 5/1989 | Honda | 280/743 |
| 4,836,576 | 6/1989 | Werner et al. | 280/743 |

OTHER PUBLICATIONS

*Metals Handbook, Desk Edition,* American Solciety for Metals, pp. 48-52, 1985.

*Primary Examiner*—Richard A. Bertsch
*Attorney, Agent, or Firm*—Calfee, Halter, & Griswold

[57] ABSTRACT

The present invention provides a new and useful housing structure for an inflator, particularly an inflator for a vehicle air bag system. The inflator housing has a wall with gas dispensing nozzles extending through it. The wall is (i) relatively thick in certain areas (e.g., the nozzle area), to provide adequate resistance to gas pressures and thrust forces applied to the housing during operation of the inflator, and (ii) relatively thin in certain other areas, to reduce the weight of the inflator. The housing is preferably constructed of a lightweight material (e.g., aluminum). The housing configuration of the present invention helps further reduce the weight of the inflator, while not unduly reducing the strength of the inflator to withstand the gas pressures and thrust forces applied to the housing during operation of the inflator.

25 Claims, 5 Drawing Sheets

INFLATOR HOUSING STRUCTURE

TECHNICAL FIELD

The present invention relates to a housing structure for an inflator, particularly an inflator for a vehicle air bag restraint system. The housing structure has a wall which is (i) relatively thick in certain areas (e.g., the nozzle area), to provide adequate strength to withstand gas pressures and thrust forces applied to the housing during operation of the inflator, and (ii) relatively thin in other areas, to minimize the overall weight of the inflator.

BACKGROUND

One known type of inflator for a vehicle air bag system is shown in U.S. Pat. No. 4,698,107. The inflator comprises a cylindrical housing which encloses a solid gas generating material. In an emergency situation, the gas generating material is ignited, and generates inert, non-toxic gas (e.g., nitrogen), under pressure, within the housing. The cylindrical housing includes a series of nozzles which direct gas generated by the solid gas generating material out of the housing to inflate the vehicle air bag. As the gas is directed through the nozzles, thrust forces are applied to the cylindrical housing.

In many known inflator designs, the walls of the inflator housing are constructed of steel or other high strength metal. However, an inflator with a steel housing is relatively heavy. To reduce the weight of the inflator, it has been suggested to make the inflator housing of aluminum or other lightweight metal (see e.g., U.S. Pat. No. 4,561,675).

In the applicant's experience, inflator housings, whether made of steel or aluminum, normally have walls of substantially uniform thickness. That thickness is determined by the minimum thickness required in the areas of the walls containing the gas dispensing nozzles. The areas of the walls containing the gas dispensing nozzles tend to be the weakest structural areas of the housings, because the nozzles create discontinuities in the walls. Thus, it has been customary to construct the entire walls of the housings with a minimum thickness such that the portions of the walls containing the gas dispensing nozzles can withstand the gas pressures and thrust forces applied to the inflator housing during operation of the inflator.

SUMMARY OF THE PRESENT INVENTION

The present invention provides an inflator housing structure with a wall whose thickness varies in selected areas, to enable the inflator housing to withstand the gas pressures and thrust forces applied to the housing during inflation and to help minimize the overall weight of the inflator. The wall is relatively thick in certain areas (e.g., the nozzle area) to provide adequate strength to withstand gas pressures and thrust forces, and relatively thin in other areas to reduce the weight of the inflator housing. When the wall is constructed of a lightweight material (e.g., aluminum), the design of the wall according to the present invention enables the weight of the inflator to be further reduced without unduly reducing the strength of the inflator to withstand the gas pressures and thrust forces applied to the housing during operation of the inflator.

According to the preferred form of the present invention, the inflator housing structure comprises a container with a wall having relatively thick portions in certain selected areas and relatively thin portions in other selected areas. The container wall is relatively thick in areas such as the nozzle area (i.e., the area of the container wall which includes the nozzles), the reaction area (i.e., the area of the container diametrically opposite to the nozzle area), and the ends of the container. The container wall is relatively thin in other areas (i.e., the areas of the container wall located between the nozzle area and the reaction area), to reduce the weight of the inflator.

According to the preferred embodiment, the container is made of a lightweight metal such as aluminum. The configuration of the container, especially in the transition zones between the thicker and thinner areas of the wall, is such that the container can be cold formed, by conventional impact extrusion techniques, without cracking the container during extrusion.

Accordingly, it is the basic object of the present invention to provide an inflator housing structure with a wall having relatively thick portions in certain areas, to provide adequate strength to withstand gas pressures and thrust forces, and relatively thin portions in other areas, to minimize the overall weight of the inflator.

It is a further object of the preferred form of this invention to provide an inflator housing structure which can be cold formed of a lightweight material (e.g., aluminum) by conventional impact extrusion techniques.

Further objects and advantages of the present invention will become further apparent from the following detailed description and the accompanying drawings.

DETAILED DESCRIPTION OF THE PREFERRED EMBODIMENT

Figure 1:
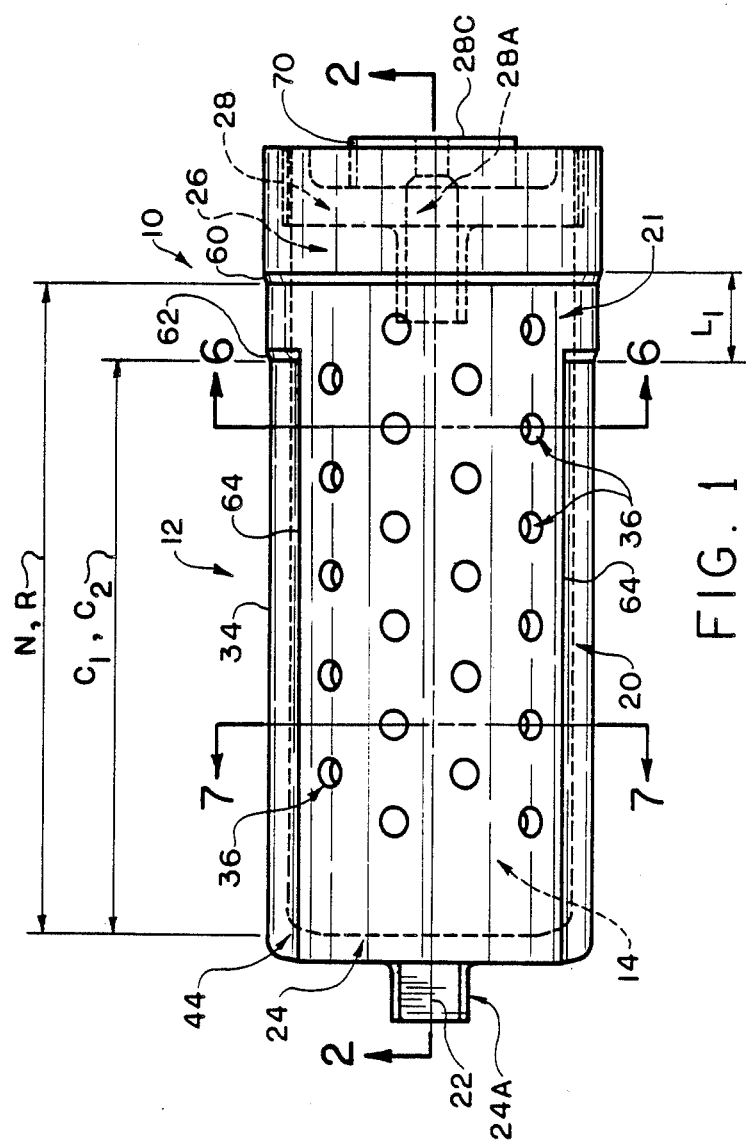
FIG. 1 is a side elevational view of an air bag inflator constructed according to the principles of this invention.
Figure 2:
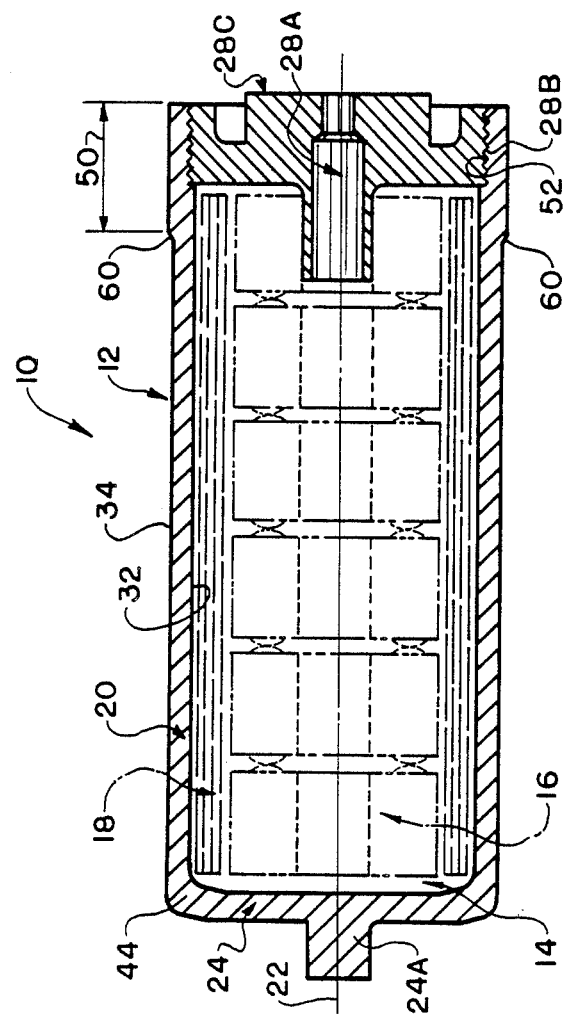
FIG. 2 is a longitudinal sectional view of the air bag inflator, taken from the direction of 2—2 in FIG. 1, with materials inside the inflator housing shown schematically.
Figure 3:
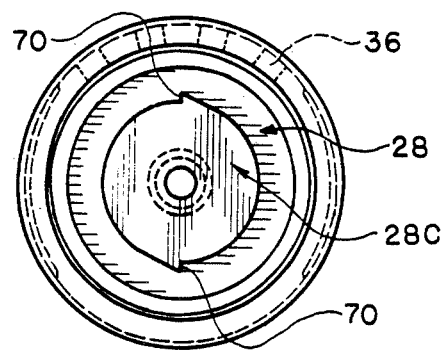
FIG. 3 is a right end view of the air bag inflator of FIG. 1.
Figure 4:
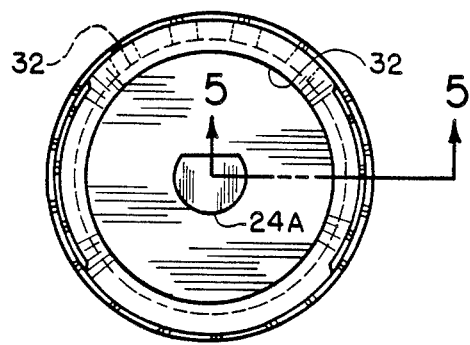
FIG. 4 is a left end view of the air bag inflator of FIG. 1.
Figure 5:
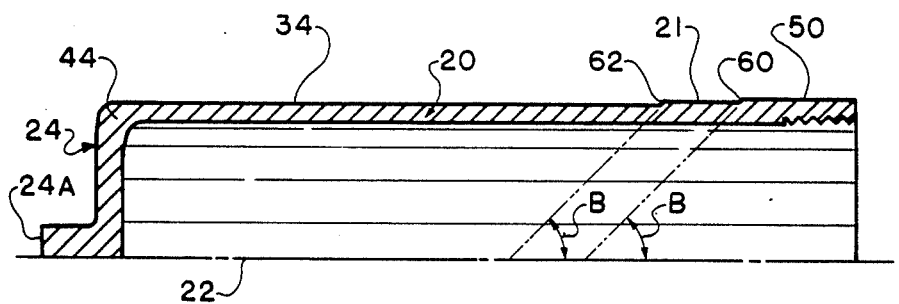
FIG. 5 is a fragmentary sectional view of the air bag inflator of FIG. 4, taken from the direction 5—5, with materials inside the inflator housing omitted.

FIGS. 1-9 illustrate an inflator and an inflator housing for a driver side air bag restraint system. In the Figures, an inflator 10 comprises a container 12 which defines a cavity 14 for a solid gas generating material (shown schematically at 16 in FIG. 2) and a filter structure (shown schematically at 18 in FIG. 2). The solid gas generating material 16 can be any known solid gas generating material used with vehicle air bags. A preferred gas generating material is made primarily of sodium azide and iron oxide, as described in U.S. Pat. No. 4,696,705 and 4,698,107, which are assigned to the assignee of this invention. As discussed in the foregoing patents, the solid gas generating material is preferably formed into pellets (or grains) which are stacked adjacent each other in the container. The filter structure 18 can be made of known filter materials (e.g., wire mesh, steel wool, fiberglas and ceramic felt-like materials) in a configuration which is suitable for use with the particular gas generating material. The specific nature of the solid gas generating material 16 and the filter structure 18 do not form a part of the present invention, and are not described further herein.

The container 12 is a cup-like member with a main wall 20 circumscribing a longitudinal central axis 22, and an end wall 24 formed in one piece with one longitudinal end of the main wall 20. The other longitudinal end of the main wall 20 defines an opening 26. An end cap 28 is attached to the main wall 20 to close the opening 26 after the solid gas generating material 16 and the filter structure 18 have been inserted into the container 12.

The end wall 24 has a boss 24A formed in one piece with and extending from the wall 24. The boss 24A is used to locate and align the inflator 10 in an air bag module (not shown), in a manner well known to those of ordinary skill in the air bag art. The end cap 28 has a central opening 28A for receiving an initiator/igniter structure (not shown). The initiator/igniter structure responds to an emergency signal to actuate the gas generating material 16, as is well known to those in the air bag art.

The main wall 20 of the container 12 has an inside surface 32 and an outside surface 34. The inside surface 32 of the main wall 20 is a relatively smooth, cylindrical surface with a constant diameter. Thus, the inside of the container 12 has a cylindrical surface adjacent the filter structure 18. The outside surface 34 of the main wall 20 has a relatively complex geometry, as described hereinafter.

A series of gas dispensing nozzles 36 extend radially through the main wall 20 of the container 12. The gas dispensing nozzles 36 are located in a nozzle area N extending longitudinally along a selected longitudinal part of the main wall 20 (see FIGS. 1, 6, 7). As seen from FIGS. 6, 7, the nozzle area N also partially circumscribes the longitudinal axis 22, i.e., the nozzle area N extends over a selected circumferential portion of the main wall 20. Moreover, the main wall 20 in the nozzle area N perferably has a substantially constant thickness (see e.g., FIGS. 6, 7).

In a driver side inflator according to the preferred embodiment, the length of the main wall 20 is about 129.16 millimeters, the length of the nozzle area N is about 107.55 millimeters, and the outside diameter of the main wall 20 in the nozzle area N is about 55.12 millimeters. There are four rows of nozzles 36, two rows containing five nozzles and two rows containing six nozzles. Each nozzle is approximately 4.75 millimeters in diameter. The entire nozzle area N extends approximately 100° about the longitudinal axis 22 (see FIG. 7).

Figure 7:
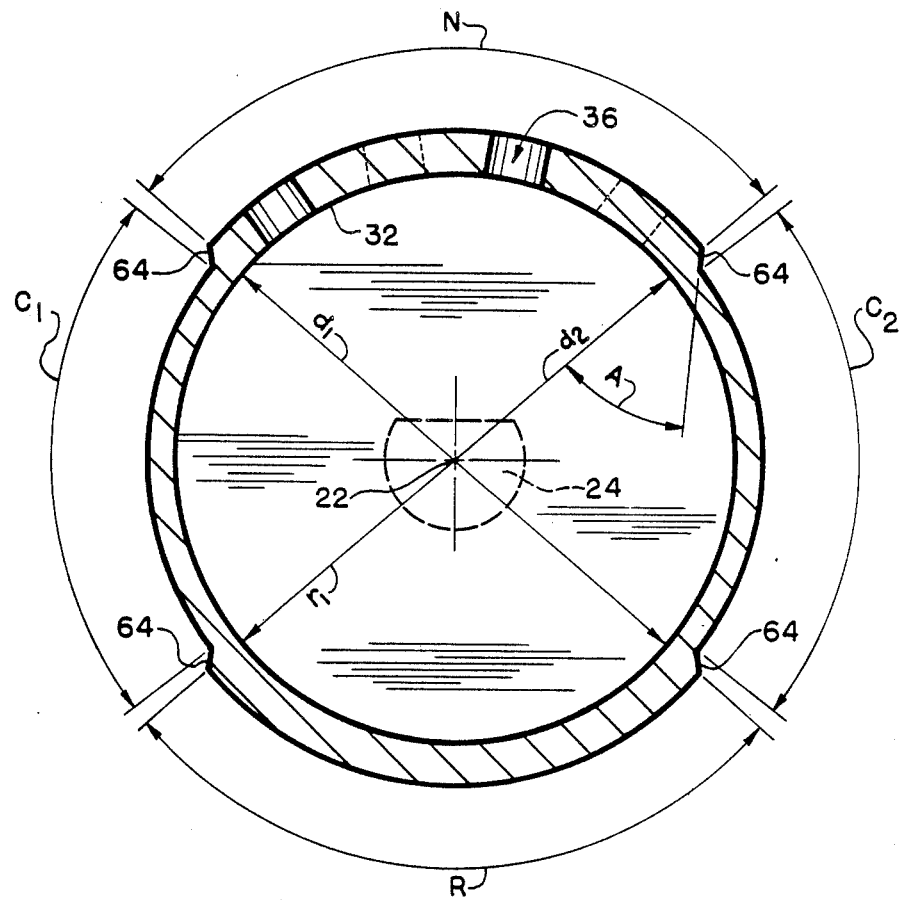
FIG. 7 is an enlarged sectional view of the inflator of FIG. 1 taken from the direction 7—7, with materials inside the inflator housing omitted.
Figure 8:
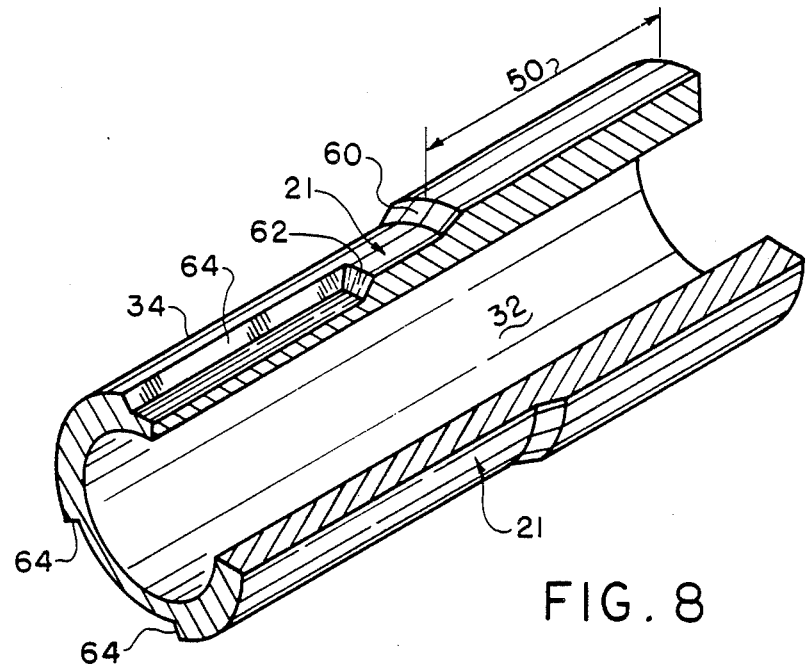
FIG. 8 is a fragmentary, schematic perspective illustration of the inflator housing of the preferred embodiment, illustrating part of the configuration of the main wall of the housing.
Figure 9:
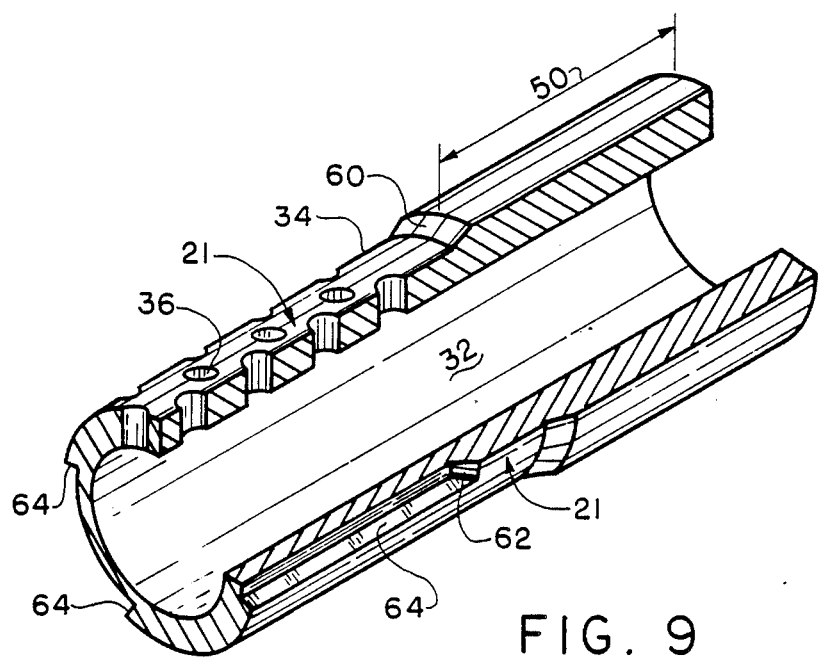
FIG. 9 is another fragmentary, schematic perspective illustration of the inflator housing of the preferred embodiment, with the nozzles omitted, and with the housing rotated to show another part of the geometry of the main wall of the housing.

Another portion of the main wall 20 defines a reaction area R. The reaction area R is approximately coextensive with the nozzle area N along the longitudinal axis 22 and extends over a selected circumferential portion of the main wall 20 disposed diametrically opposite the nozzle area N. As seen in FIG. 7, an internal diameter $d_1$ from one longitudinally extending edge of the nozzle area N extends to one longitudinally extending edge of the reaction area R and an internal diameter $d_2$ taken from the other edge of the nozzle area N extends to the other edge of the reaction area R. Thus, the reaction area R is diametrically opposite to the nozzle area N, and extends approximately 100° about the longitudinal axis 22.

The thickness of the main wall 20 in the reaction area R is preferably the same as the thickness of the main wall 20 in the nozzle area N. Moreover, an annular segment 21 of the main wall 20, having the same thickness as the nozzle and reaction areas N, R (see FIGS. 1, 2, 8, 9), is integral with and forms part of each of the nozzle and reaction areas N, R.

Figure 6:
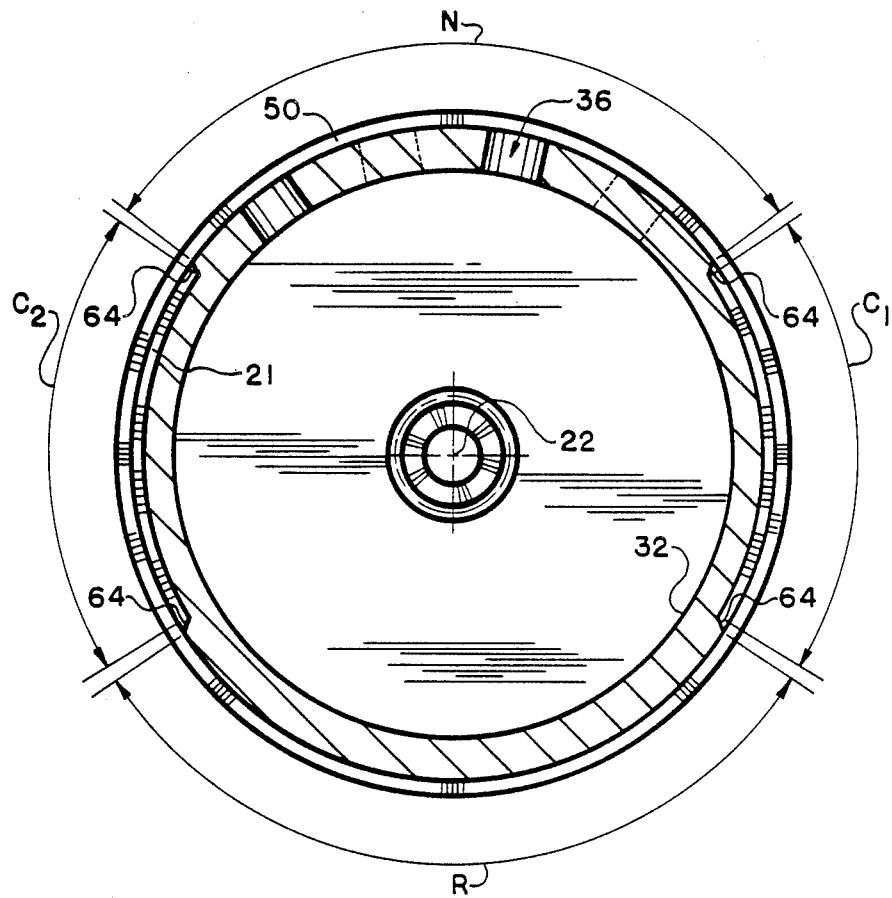
FIG. 6 is an enlarged sectional view of the air bag inflator of FIG. 1, taken from the direction 6—6, with materials inside the inflator housing omitted.

Still other portions of the main wall 20 define a pair of connecting areas $C_1$, $C_2$ (see e.g., FIGS. 1, 6, 7). The connecting areas $C_1$, $C_2$ extend between the nozzle area N and the reaction area R (see FIG. 7). Each connecting area extends approximately 80° about the longitudinal axis 22 (see FIG. 7). As seen from FIG. 1, the connecting areas $C_1$, $C_2$ are co-extensive along the longitudinal axis 22. Further, the length of each of the connecting areas $C_1$, $C_2$ is slightly less than the length of the nozzle and reaction areas N, R (see FIG. 1). According to the preferred embodiment, the length of each of the connecting areas $C_1$, $C_2$ is about 94.85 millimeters. Also, the connecting areas $C_1$, $C_2$ are substantially equal in thickness (see FIG. 7).

The thickness of the main wall 20 in the nozzle and reaction areas N, R is greater than the thickness of the main wall 20 in the connecting areas $C_1$, $C_2$. During operation of the inflator, gas is generated within the container 12 and is expelled through the nozzles 36. The pressure of the gas, and the thrust forces produced as the gas is expelled through the nozzles 36, act on the main wall 20 of the housing. The main wall 20 is relatively thick in the nozzle and reaction areas N, R, to withstand the gas pressures and the thrust forces applied to the nozzle and reaction areas of the main wall. The main wall 20 is relatively thin in the connecting areas $C_1$, $C_2$, to minimize the weight of the inflator. Since the main wall 20 is continuous (i.e., unbroken by nozzles, etc.) in the connecting areas $C_1$, $C_2$, the main wall 20 can be thinner in the connecting areas $C_1$, $C_2$ and still withstand the gas pressures applied to the connecting areas of the main wall during operation of the inflator.

According to the preferred embodiment, the inside cylindrical surface 32 of the main wall 20 has a constant diameter of about 47.50 millimeters. The diameter of the outside surface 34 of the main wall 20 in the nozzle and reaction areas is about 55.12 millimeters. The diameter of the main wall 20 in the connecting areas $C_1$, $C_2$ is about 54 millimeters. Thus, the thickness of main wall 20 is about 3.81 millimeters in each of the nozzle and reaction areas N, R, and about 3.25 millimeters in each of the connecting areas $C_1$, $C_2$.

In addition to the nozzle and reaction areas, the longitudinal ends of the inflator housing must be designed to resist relatively high pressures during inflation. Thus, as seen from FIG. 2, the thickness of the end wall 24 of the container 12 is greater than the thickest part of the main wall 20. According to the preferred embodiment, the thickness of the end wall 24 is about 4.55 millimeters, whereas the thickest portion of main wall 20 has a maximum thickness of about 4.505 millimeters. Moreover, the container 12 includes an annular wall portion 44 which connects the main wall 20 and the end wall 24, and the thickness of that annular wall portion 44 is at least as great as the thickness of the end wall 24 (see e.g., FIG. 2).

The opening 26 of the main body 20 has a relatively thick, annular portion 50 circumscribing the longitudinal axis 22. The relatively thick wall portion 50 has a relatively constant outer diameter of about 56.13 millimeters and a maximum thickness of about 4.505 millimeters. The wall portion 50 has internal threads 52 for receiving external threads 28B on the end cap 28, to enable the end cap 28 to be securely attached to the container 12 after the gas generating material 16 and filter structure 18 have been inserted. As seen from the Figures, the thickness of wall portion 50 is greater than the thickness of main wall 20 in the nozzle and reaction areas N, R (see e.g., FIGS. 1, 2, 5, 8 and 9).

In order for the inflator housing to have a cylindrical inner surface with a constant inner diameter and the variable wall thickness described above, the outer surface 34 of the wall has a relatively complex, geometric profile. Specifically, the outer surface 34 has an annular, sloping surface portion 60 extending between the thick wall portion 50 and the nozzle and reaction areas N, R (see FIGS. 1, 5, 8 and 9). The outer surface 34 also has sloping portions 62 and additional sloping portions 64 extending between the nozzle and reaction areas N, R and the connecting areas $C_1$, $C_2$ (see FIGS. 1, 5, 7, 8 and 9). According to the preferred embodiment, the sloping portion 60 forms a circumferentially extending discrete step between the thicker wall portion 50 and the annular wall portion 21 and nozzle area N. The sloping portions 62 partially circumscribe the longitudinal axis 22 and define additional discrete steps between the thick wall portion 50 and the connecting areas $C_1$, $C_2$. The sloping portions 64 define discrete longitudinally extending steps between the nozzle and reaction areas N, R and the connecting portion $C_1$ $C_2$. Each of the sloping portions 60, 62 slopes at an angle A of about 52° relative to the longitudinal axis 22 (see FIG. 5). The longitudinally extending sloping portion 64 slopes at an angle B of about 45° relative to the radial direction $r_1$ of the main wall 20 (see FIG. 7).

According to the preferred embodiment, the container 12 is cold formed by impact extrusion. The preferred material is 2014 aluminum, which is a lightweight, high strength aluminum and well known as a material that can be readily formed by conventional impact extrusion techniques. Generally, the techniques for impact extruding a cup-like part such as the container 12 of the invention are well known to those of ordinary skill in the aluminum fabricating arts. The presses, the tooling, the lubricant for impact extruding 2014 aluminum are all well known. What is significant in forming an impact extruded aluminum inflator according to the principles of this invention is shaping the die to match the complex, geometry of the outer surface 34 of the container 12. It is the geometry of the outer surface 34 which enables the container 12 to be cold formed, by impact extrusion, without cracking the container during extrusion.

Specifically, in the driver side inflator according to the preferred embodiment, the length $L_1$ (FIGS. 1, 5) of the main wall 20 over which the diameter reduces from the thickest wall portion (i.e., the portion 50) to the thinnest wall portions (i.e., the connecting areas $C_1$, $C_2$) is preferably about 12.7±0.5 millimeters. Further, according to the preferred embodiment, the diameter of the main wall 20 reduces from about 56.25±0.13 millimeters to about 54.00±0.13 millimeters over that length $L_1$. Thus, the profile of the outer surface 34 is such that the outer diameter of the main wall 20 reduces by up to about 0.103 millmeters per 1.0 millimeter in length of the main wall 20. Applicant believes that for a driver side inflator made of 2014 aluminum, the impact extrusion die should be designed to provide a slope in the foregoing range in order to minimize the risk of cracking the container during extrusion. Moreover, while two discrete steps (60, 62) are preferred between the wall portion 50 and each of the connecting areas $C_1$, $C_2$, it is believed that the main wall 20 can have a single, gradually sloping outer surface between the wall portion 50 and the connecting areas $C_1$, $C_2$, so long as the slope is maintained in the foregoing range. Still further, applicant believes it may be possible to make the end portion 50 of the main wall 20 the same thickness as the nozzle and reaction areas N, R, but it is still important to provide a slope in the foregoing range to avoid cracking the wall during impact extrusion.

During the extrusion process, the end wall 24 and the boss 24A are formed in one piece with the main wall 20. The die for the extrusion is preferably a solid, single piece die with a profile matching the outer profile of the container (including the profile of the steps 60, 62 and 64). Alternatively, the die can comprise a sleeve and holder, with the inside profile of the sleeve matching the profile of steps 60, 62 and 64. Such die forms are well known to those in the aluminum fabricating arts and should not require further explanation. The extrusion is preferably accomplished by reverse extrusion, which is a well known technique for impact extruding aluminum and should not require further explanation. What is important, for impact extruding the container of the invention out of aluminum, is to provide a die whose geometry will produce a slope according to the preferred embodiment, to avoid cracking of the container during extrusion.

After the inflator container 12 is formed, by the impact extrusion techniques discussed above, the nozzles 36 are drilled in the nozzle area N, and the threads 52 are formed on the inside of the wall 50 of the container 20. The threads 52 are designed to match the external threads 28B on the end cap 28, to allow the end cap 28 to be attached to the main wall 20. At the outer end of the end cap 28, there is a protrusion 28C having a pair of surfaces 70 (see FIG. 3). The surfaces 70 can be engaged by a wrench or other tool to enable the end cap 28 to be tightened in the container 12.

Thus, the foregoing preferred embodiment provides a configuration of a driver side inflator housing made of type 2014 aluminum. Moreover, it is believed that the foregoing principles can be used to construct a passenger side inflator out of 2014 aluminum. A passenger side air bag normally has a greater volume than a driver's side air bag. Therefore, a passenger side inflator is designed to contain a larger amount of propellant than a driver's side inflator, to enable the passenger side inflator to generate sufficient gas in an appropriate time frame to fill the air bag. Generally, a passenger side inflator has a configuration similar to the configuration of FIGS. 1-7, but with a greater length and a greater diameter to enable the inflator to contain more propellant material than a driver side inflator. Applicant believes that the same housing structure and fabricating techniques disclosed above can be used to form a passenger side inflator. Moreover, it may be desirable to drill additional nozzles in the reaction area of the main wall to enable excess gas to be directed out of the inflator but away from the air bag.

Still further, using the principles of the present invention, applicant believes it would be possible to form an inflator housing out of another light weight material such as 6061 aluminum. 6061 aluminum is lower in strength thatn 2014 aluminum but is more formable by impact extrusion techniques. Applicant believes that a driver side inflator made of 6061 aluminum should have a main wall with an outer surface whose slope between the thick and thin wall portions reduces by up to 0.17 mm per 1.0 mm of length of the inflator housing.

Accordingly, there has been described above an inflator housing structure which can withstand the gas pressures and thrust forces applied to the housing structure during operation of the inflator, while reducing the overall weight of the inflator. Further, there has been described above a preferred inflator housing structure which can be formed of aluminum, by cold forming techniques which are known in the art. However, with the present disclosure in mind, it is believed that obvious alternatives to the preferred embodiment, to achieve comparable weight reductions in other forms of inflator materials, will become apparent to those of ordinary skill in the art.

I claim:

1. An air bag inflator structure, comprising
a container having a longitudinal axis and a wall that circumscribes said longitudinal axis, said wall at least partially defining a cavity for receiving a gas generating means and having gas dispensing nozzles extending through said wall;
said wall including (a) a nozzle area extending along a selected longitudinal portion of said wall and partially circumscribing said longitudinal axis, (b) a reaction area partially circumscribing said longitudinal axis and disposed diametrically opposite said nozzle area and (c) connecting areas partially circumscribing said longitudinal axis so as to extend between said nozzle area and said reaction area, the thickness of said wall in said nozzle area being greater than the thickness of said wall in said connecting areas, and said gas dispensing nozzles being disposed in said nozzle area.

2. An air bag inflator structure as defined in claim 1 wherein the thickness of said wall in said reaction area is greater than the thickness of said wall in said connecting areas.

3. An air bag inflator structure as defined in claim 2 wherein the thickness of said wall in said reaction area is substantially the same as the thickness of said wall in said nozzle area.

4. An air bag inflator structure as defined in claim 3 wherein said wall has an outer surface sloping at a predetermined rate from the nozzle area to the connecting areas.

5. An air bag inflator structure as defined in claim 4 wherein said container comprises an end wall formed in one piece with said wall adjacent one longitudinal end thereof to define an integral closed end for the container, said wall adjacent the other longitudinal end thereof having an annular wall section defining an opening for receiving an end closure, the thickness of said wall section being greater than the thickness of said wall in said connecting areas, the outer surface of said wall sloping at a predetermined rate between said wall section and said connecting areas.

6. An air bag inflator structure as defined in claim 5 wherein said predetermined rate is such that the outer diameter of said wall reduces by up to about 0.103 mm per 1.0 mm in length of said wall.

7. An air bag inflator structure as defined in claim 6 wherein the thickness of said wall section is greater than the thickness of said wall in said nozzle area, the thickness of said wall is substantially constant in said nozzle area, and the outer surface of said wall has (a) a first sloping portion which defines a first discrete step extending between said wall section and said nozzle area and (b) an additional sloping portion which defines an additional discrete step extending between said nozzle area and at least one of said connecting areas, said additional sloping portion partially circumscribing said longitudinal axis.

8. An air bag inflator structure as defined in any of claims 1-7 wherein said container comprises cold-formed aluminum.

9. An air bag inflator structure as defined in claim 8 wherein said container comprises impacted extruded aluminum.

10. An air bag inflator structure as defined in claim 9 wherein said container comprises type 2014 aluminum.

11. An air bag inflator structure as defined in claim 5 wherein said container comprises type 6061 aluminum, and wherein said predetermined rate is such that the outer diameter of said wall reduces by up to about 0.17 mm per 1.0 mm in length of said wall.

12. An air bag inflator structure as defined in claim 11 wherein the thickness of said wall section is greater than the thickness of said wall means in said nozzle area, the thickness of said wall is substantially constant in said nozzle areas and said outer surface of said wall has a first sloping portion, which defines a first discrete step extending between said wall section and said nozzle area and an additional sloping portion which defines an additional discrete step extending between said nozzle area and said connecting areas.

13. An air bag inflator structure as defined in claim 12 wherein said container comprises cold-formed aluminum.

14. An air bag inflator structure as defined in claim 13 wherein said container comprises impacted extruded aluminum.

15. An air bag inflator structure comprising
a container having a wall that circumscribes a longitudinal axis of the container and defines a cavity for receiving a gas generating means;
said wall having gas dispensing nozzles extending therethrough, said gas dispensing nozzles being disposed in a nozzle area extending along a selected part of a main body portion and partially circumscribing said longitudinal axis, said wall having a reduced thickness area adjacent said nozzle area and partially circumscribing said longitudinal axis, said reduced area having a thickness which is less than the thickness of said wall in said nozzle area.

16. An air bag inflator structure as defined in claim 15 wherein said container comprises a first end wall with said wall adjacent one longitudinal end of said container to define an integral closed end for the container, said wall adjacent the other longitudinal end of said container having an annular wall section longitudinally spaced from said reduced thickness area and defining an opening for receiving a second end closure, the thickness of said wall section being greater than the thickness of said wall in said reduced thickness area, the outer surface of said wall sloping at a pre-determined rate between said annular wall section and said reduced thickness area.

17. An air bag inflator structure as defined in claim 16 wherein said predetermined rate is such that the outer diameter of said wall reduces by up to about 0.103 mm per 1.0 mm in length of said wall.

18. An air bag inflator structure as defined in claim 17 wherein the thickness of said annular wall section being greater than the thickness of said wall in said reduced thickness area, the thickness of said wall is substantially constant in said nozzle area, and the outer surface of said wall has a first sloping portion which defines a first discrete step extending between said annular wall section and said nozzle area and an additional sloping portion which defines an additional discrete step extending between said nozzle area and said reduced thickness.

19. An air bag inflator structure as defined in any of claims 15-18 wherein said container comprises cold-formed aluminum.

20. An air bag inflator structure as defined in claim 19 wherein said container comprises impacted extruded aluminum.

21. An air bag inflator structure as defined in claim 20 wherein said container comprises type 2014 aluminum.

22. An air bag inflator structure as defined in claim 16 wherein said container comprises type 6061 aluminum, and wherein said predetermined rate is such that the outer diameter of said wall reduces by up to about 0.17 mm per 1.0 mm in length of said wall.

23. An air bag inflator structure as defined in claim 22 wherein the thickness of said annular wall section being greater than the thickness of said wall in said reduced thickness area, the thickness of said wall is substantially constant in said nozzle area, and the outer surface of said wall has a first sloping portion which defines a first discrete step extending between said annular wall section and said nozzle area and an additional sloping portion which defines an additional discrete step extending between said nozzle area and said reduced thickness.

24. An air bag inflator structure as defined in claim 23 wherein said container comprises cold-formed aluminum.

25. An air bag inflator structure as defined in claim 24 wherein said container comprises impacted extruded aluminum.

* * * * *